MAGNETIC RECORDING TAPE

Filed Dec. 28, 1970 3 Sheets-Sheet 1

INVENTORS
WILLIS D. HALLER
RAYMOND M. COLLINE
BY Kinney, Alexander,
Sell, Steldt & De La Hunt
ATTORNEYS INVENTORS
WILLIS D. HALLER
RAYMOND M. COLLINE
BY Kinney, Alexander, Sell, Steldt & DeLaHunt
ATTORNEYS INVENTORS
WILLIS D. HALLER
RAYMOND M. COLLINE
BY Kinney, Alexander, Sell, Steldt & De La Hunt
ATTORNEYS United States Patent Office 3,725,126

Patented Apr. 3, 1973

3,725,126

MAGNETIC RECORDING TAPE

Willis D. Haller, St. Paul, and Raymond M. Colline, Oakdale, Minn., assignors to Minnesota Mining and Manufacturing Company, St. Paul, Minn.

Continuation-in-part of applications Ser. No. 706,401, Feb. 19, 1968, now Patent No. 3,573,980, and Ser. No. 32,919, Apr. 29, 1970, now abandoned. This application Dec. 28, 1970, Ser. No. 102,029

Int. Cl. C04b *35/26;* G11b *5/78*

U.S. Cl. 117—235 8 Claims

ABSTRACT OF THE DISCLOSURE

Magnetic recording tape having a coating of oriented magnetizable particles in a binder affording superior ability to store high frequency information by virtue of oriented magnetizable acicular iron oxide particles modified with small amounts of cobalt oxide, which iron oxide particles comprise gamma-$Fe_2O_3$. At approximately two parts by weight per one part of binder and physically aligned, the novel particles provide in the aligned direction a coercivity $H_c$ exceeding 350 oersteds and a $B_r$ exceeding 800 gauss. Higher coercivity may be attained by controlling the heating steps in making the novel particles to provide up to about 25% FeO by weight of the total iron oxide.

CROSS-REFERENCE TO RELATED APPLICATIONS

This application is a continuation-in-part of our copending applications Ser. No. 32,919, filed Apr. 29, 1970, now abandoned and Ser. No. 706,401, filed Feb. 19, 1968, now Pat. No. 3,573,980, which claim methods of making the novel acicular particles and of using these to make magnetic recording tape.

FIELD OF THE INVENTION

This invention primarily concerns a unique magnetic recording tape of the type having a coating of oriented magnetizable particles in a nonmagnetizable binder. The magnetizable particles are also unique.

DESCRIPTION OF THE PRIOR ART

Almost all magnetic recording tape comprises a thin, strong, flexible, nonmagnetizable backing member carrying a uniform coating of a homogeneous mixture comprising a minor proportion of a nonmagnetizable binder and a major proportion by weight of magnetizable particles, usually acicular gamma-$Fe_2O_3$. It has long been hypothesized that any increase in the coercivity of the magnetizable particles should provide an improvement in the storage of high frequency information. In the recording of digital information, higher coercivity would be expected to improve pulse resolution. Corresponding improvements would be expected in the recording of television signals or the recording of high-frequency analog data.

Very high coercivity has been achieved by the addition of cobalt ions to cubic iron oxide particles, but the magnetization instability at high temperatures has restricted application in magnetic recording. Speliotis and Morrison, "Magnetic Recording Materials," New York Academy of Science Transactions, vol. 28, No. 8, pages 1005–1019, at page 1017 (May 1966), indicated that the poor temperature stability provided by cobalt-doped iron oxide particles was due to their cubic shape, and they predicted that if acicular cobalt-substituted gamma-$Fe_2O_3$ particles could be produced, they should have good temperature stability and be prime contenders for optimized recording surfaces.

Cobalt-containing acicular gamma-$Fe_2O_3$ particles have been produced according to Abeck et al. Pat. No. 3,117,933 for the production of magnetic recording tape, but not of commercially useful quality. Abeck's particles do not provide magnetic recording tape possessing the combination of high coercivity, retention of remanence after exposure to elevated temperatures, and squareness of hysteresis loop (ratio of $\phi_r$ to $\phi_{max}$) that is essential for recording high frequency information on a commercial basis.

Jeschke Pat. No. 3,243,375 reports the production of acicular cobalt doped gamma-$Fe_2O_3$ particles, but these likewise are unsuited for commercial magnetic recording tape use.

SUMMARY OF THE INVENTION

The present invention concerns acicular gamma-$Fe_3O_3$ particles modified by cobalt oxide in an amount providing at least ¼ percent, preferably at least ½ percent, by weight of cobalt based on the weight of the modified iron oxide. Still higher coercivity is obtained by partially reducing the cobalt oxide modified gamma-$Fe_2O_3$ particles to FeO. When the novel particles are combined in approximately two parts by weight per one part of nonmagnetizable binder in the manufacture of magnetic recording tape and physically aligned as disclosed in Von Behren Pat. No. 2,711,901, they provide in the aligned direction (a) a coercivity exceeding 350 oersteds,
(b) a desirably high $B_r$, generally above 800 gauss,
(c) a loss of saturated remanence perpendicular to particle alignment at least 1.5 times the loss parallel to alignment (measured after 30 minutes at 150° C. as described below), and
(d) a Q-factor (quality-factor) of at least 1100.

The Q-factor is the product of (1) the coercivity in oersteds parallel to particle alignment,
(2) the ratio of the loss of saturated remanence perpendicular to particle alignment to the loss parallel to alignment after 30 minutes at 150° C., and
(3) the squareness ratio.

The squareness ratio is the ratio of the squareness ($\phi_r$ divided by $\phi_{max}$) of the magnetic recording tape measured in the direction of particle alignment to its squareness measured perpendicular thereto.

The novel cobalt oxide modified gamma-$Fe_2O_3$ particles may be made by the method claimed in our copending application Ser. No. 706,401, filed Feb. 19, 1968, i.e., by the steps of (1) forming an intimate dry admixture of ordinary acicular gamma-$Fe_2O_3$ particles and a cobalt compound, which upon heating decomposes to form cobalt oxide, and (2) heating the admixture in an inert atmosphere for a time and at a temperature sufficient to decompose the cobalt compound to form cobalt oxide and to modify the acicular particles with an appreciable proportion of cobalt. Instead of acicular gamma-$Fe_2O_3$ particles, any precursor may be used under conditions which provide acicular gamma-$Fe_2O_3$.

Saturated remanence retention

Several strips of at least 10 inches length cut parallel to particle orientation from ¼-inch magnetic recording tape are stacked in layers and inserted into 4 mm. or preferably 8 mm. thinwall glass tubing. The tape in the tubing is saturated with a DC field of 5000 oersteds, and the residual flux in the saturated tape is measured parallel to particle orientation using a ballistic galvanometer. The glass tubing containing the tape is then placed in an oil bath for 30 minutes at 150° C., allowed to cool to room temperature, and the residual flux again measured in the same direction with the ballistic galvanometer. The residual flux measured after heating the tape is reported in percent of that before heating, yielding the value defined as the saturated remanence retention.

The same test may also be carried out except that the 10-inch strips extend perpendicular to particle orientation and the residual flux is measured perpendicular to the particle orientation, both before and after heating for 30 minutes at 150° C.

At relatively low levels of coercivity (up to about 500 oersteds), the acicular particles of the present invention have a predominant shape anisotropy and provide magnetic recording tapes which in the direction of particle orientation or alignment have a saturated remanence retention after 30 minutes at 150° C. of at least 80%. The loss of saturated remanence after 30 minutes at 150° C. perpendicular to particle alignment is at least twice the loss parallel to alignment. (Loss of saturated remanence is the difference between 100% and the saturated remanence retention.)

At high levels of coercivity (above about 700 oersteds), the particles of this invention provide magnetic recording tapes having especially good squareness both parallel and perpendicular to alignment. Their saturated remanence retention parallel to particle alignment may be on the order of 70% after 30 minutes at 150° C. and their ratio of loss of saturated remanence perpendicular to alignment vs. parallel to alignment may be only 1.4. Nevertheless, these tapes are highly useful for recording high frequencies. The above-described Q-factor gives effect to each of these properties and provides a good indication of the quality of the particles and of the resultant magnetic recording tape for recording high frequency information.

Loop decay test

To test signal decay upon repeated passes, the tape is spliced to form a loop with the particles aligned in the longitudinal direction. Using an Ampex 300 tape deck, the tape is recorded at saturation level with a ½-mil (13 micron) sine wave signal at 30 kHz. and run continuously in playback mode at 15 inches per second. The level of output signal is recorded on each pass in comparison to the original output signal. Representative tapes of this invention experience a loss of no more than 3 db or less after 1000 passes. Tapes having a saturated remanence retention after 30 minutes at 150° C. of 80% and 90% can be expected to show losses of about 3 db and 1 db, respectively, in this test.

As a comparison, this test was given to a conventional magnetic recording tape made using unmodified gamma-$Fe_2O_3$ particles, viz, 3M #777 tape which is widely used commercially in data processing. This conventional commerical tape showed a loss of 1 db.

Pulse resolution test

The ability to store high frequency information may be determined by evaluating the ability to resolve closely packed square wave signals simulating digital data. The tape is tested at 15 inches per second on a Mincom Professional Tape Deck Model No. 400 having a record head of 350-micro-inch (9-micron) gap and a playback head of 90-micro-inch (2.3 micron) gap and equipped with electronics capable of squarewave recording and flat response to densities of over 10,000 flux changes per inch with sufficient drive current to oversaturate the tape. Used as the comparative standard in the test is the above-mentioned 3M #777 tape which is well regarded commercially for its ability to resolve closely packed digital data. Reported in this test is the percent output of the test tape relative to that of the standard tape at selected pulse densities (flux changes per inch).

Results in the foregoing tests, some of which are reported below, indicate that tapes of the present invention are superior to presently commercial data-processing tape in point of ability to record high frequency information and that such superiority more than offsets the small loss of signal experienced due to heat such as is generated by repeated fast-moving contact with recording and playback heads.

THE DRAWING

Figure 3:
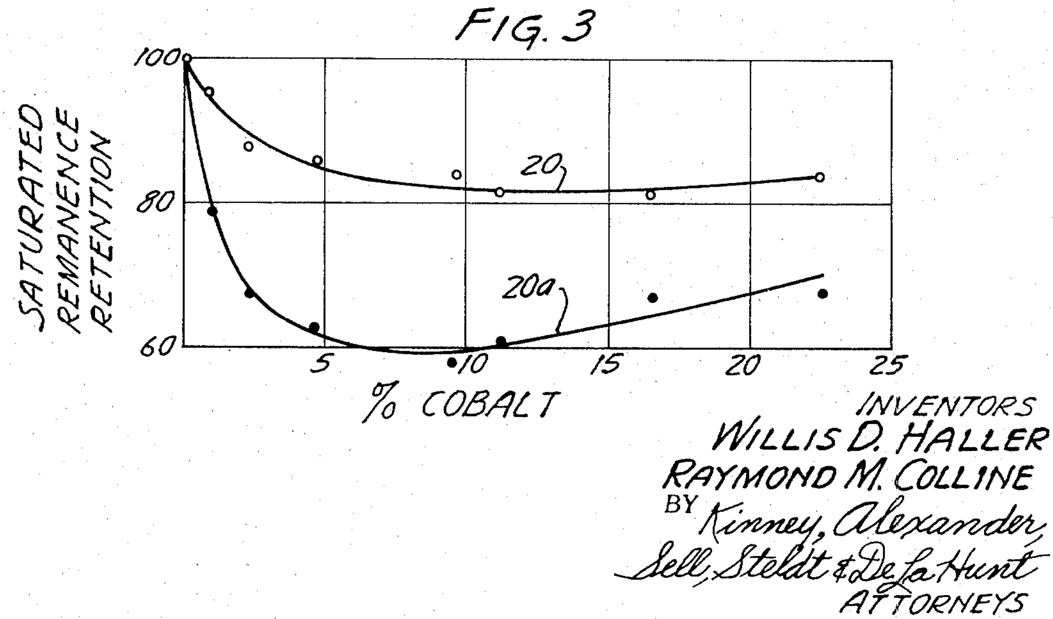

FIG. 3 is a chart showing the saturated remanence retention upon heating of representative magnetic recording tapes made from cobalt oxide modified acicular gamma-$Fe_2O_3$ particles; and FIGS. 4–7 are charts showing saturated remanence retention of representative tapes of this invention, which tapes are similar to those of FIG. 3 except that the cobalt oxide modified acicular gamma-$Fe_2O_3$ particles had been reduced to various degrees of FeO.

The charts shown in the drawing were prepared with data obtained from a number of magnetic recording tapes prepared as described above using acicular gamma-$Fe_2O_3$ particles which had been modified in various degrees in accordance with the present invention. Recorded in Table I is such data, the coercivity $H_c$ and retentivity $B_r$ being measured parallel to the particle orientation.

TABLE I

| Percent cobalt | Percent FeO | $H_c$ (oersteds) | $B_r$ (gauss) |
|---|---|---|---|
| 0.9 | 0 | 360 | 1,140 |
| | 7.7 | 455 | 1,220 |
| | 10.4 | 460 | 1,080 |
| | 17.7 | 455 | 1,290 |
| | 26.6 | 415 | 1,390 |
| 1.05 | 0 | 380 | 1,220 |
| | 6.25 | 480 | 1,190 |
| | 12.6 | 520 | 1,250 |
| | 17.5 | 530 | 1,330 |
| | 24.8 | 445 | 1,140 |
| 1.75 | 0 | 440 | 1,045 |
| | 4.1 | 555 | 1,235 |
| | 12.5 | 640 | 1,280 |
| | 18.1 | 665 | 1,280 |
| | 20.0 | 650 | 1,175 |
| 2.35 | 0 | 495 | 1,030 |
| | 2.45 | 635 | 1,210 |
| | 11.8 | 775 | 1,200 |
| | 16.2 | 805 | 1,160 |
| | 18.6 | 775 | 1,130 |
| 4.6 | 0 | 560 | 1,080 |
| | 2.6 | 820 | 1,290 |
| | 12.6 | 1,025 | 1,260 |
| | 22.0 | 735 | 1,500 |
| | 22.3 | 765 | 1,310 |
| 6.55 | 0 | 700 | 1,075 |
| | 2.05 | 1,055 | 1,110 |
| | 10.8 | 1,375 | 900 |
| | 16.6 | 1,290 | 980 |
| | 22.3 | 1,010 | 1,250 |
| 9.6 | 0 | 755 | 1,030 |
| | 1.5 | 1,500 | 915 |
| | 10.0 | 1,875 | 885 |
| | 18.0 | 1,320 | 1,530 |
| | 18.5 | 1,175 | 1,200 |
| 11.2 | 0 | 755 | 1,010 |
| | 3.2 | 1,355 | 980 |
| | 11.2 | 1,575 | 975 |
| | 12.5 | 1,575 | 1,070 |
| | 18.6 | 1,160 | 1,240 |
| 22.4 | 0 | 700 | 745 |
| | 3.0 | 1,030 | 635 |
| | 5.6 | 1,155 | 530 |
| | 10.5 | 1,125 | 890 |
| | 17.1 | 1,050 | 1,000 |

Figure 1:
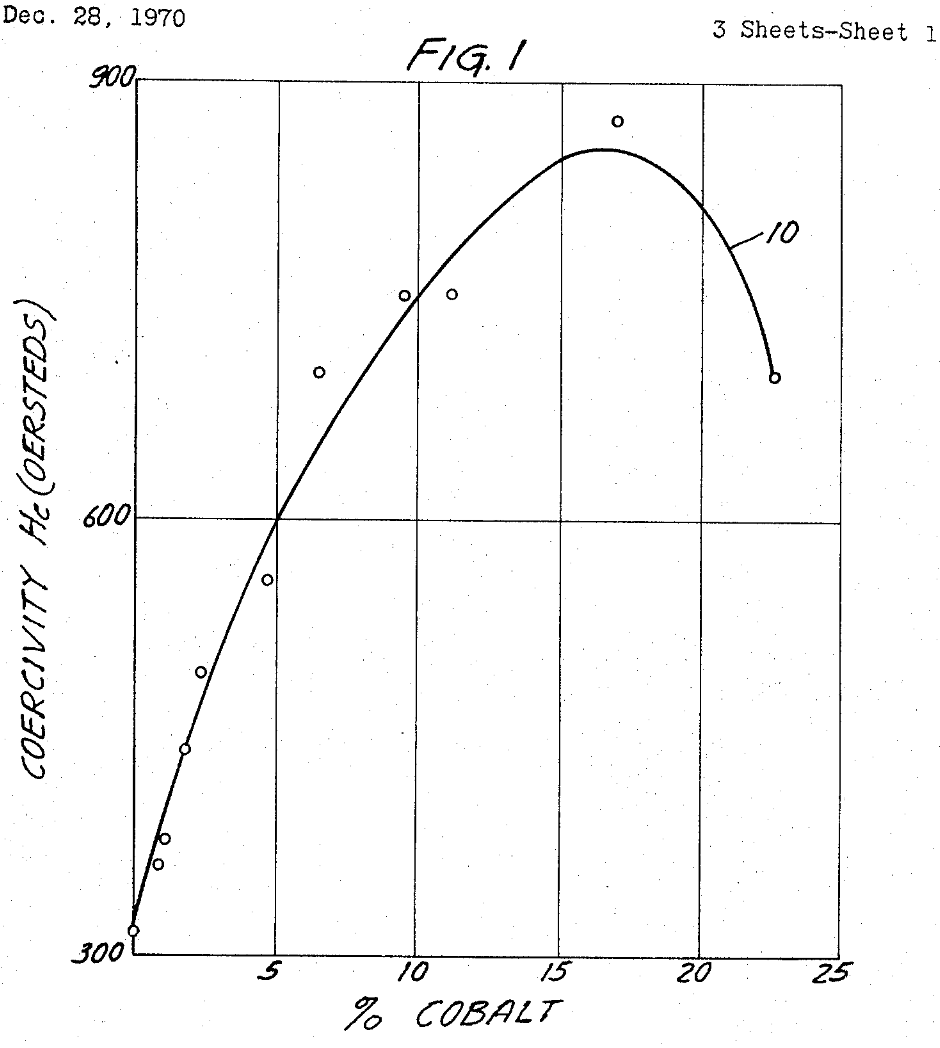
FIG. 1 is a chart showing coercivity of representative magnetic recording tapes of this invention made from acicular gamma-$Fe_2O_3$ particles modified with cobalt oxide.

Data including entries in Table I for tapes made with cobalt oxide modified gamma-$Fe_2O_3$ particles containing no FeO conversion is plotted as curve 10 of FIG. 1 showing coercivity $H_c$ vs. percent cobalt modification.

Figure 2:
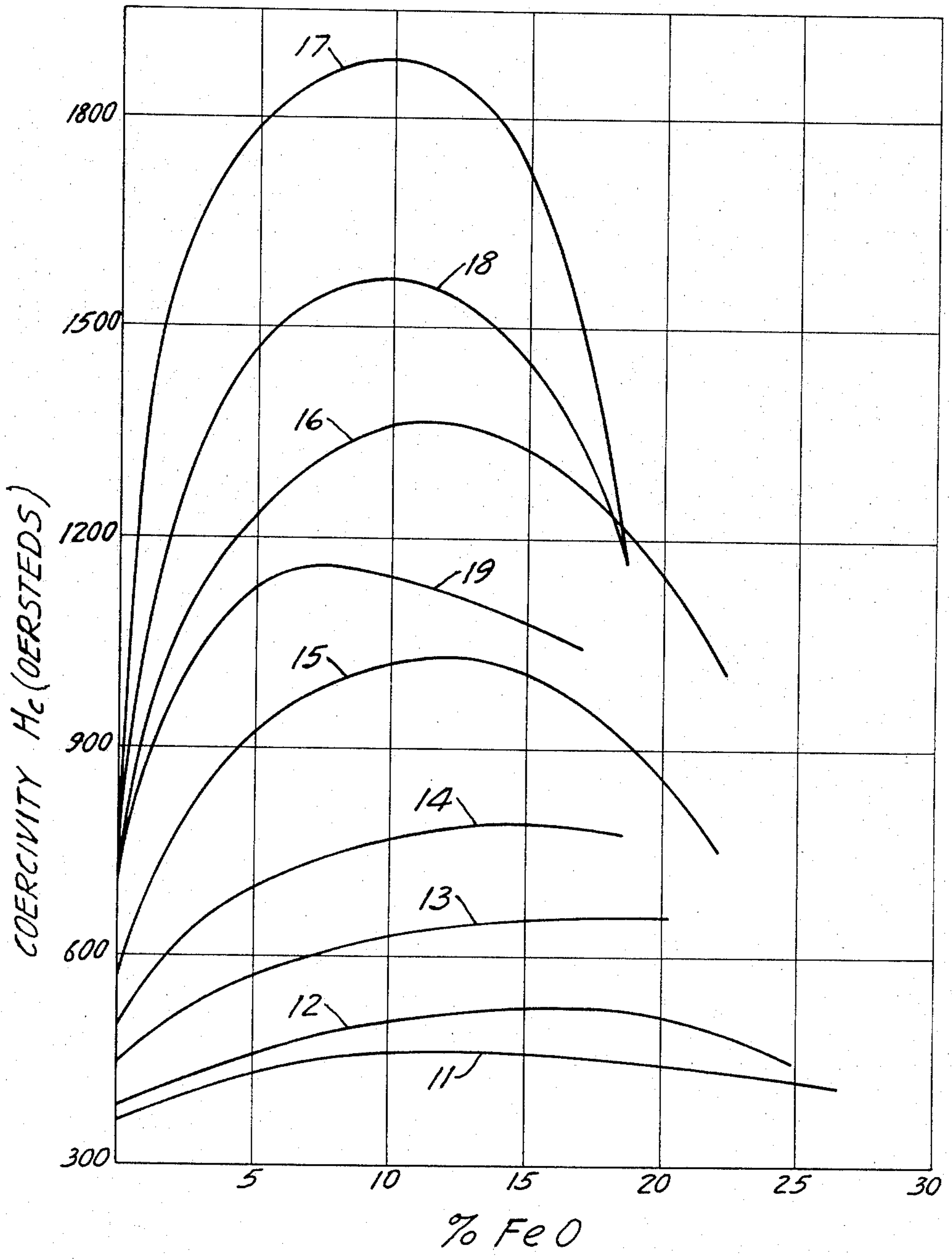
FIG. 2 is a chart showing coercivity of representative tapes of this invention, which tapes are similar to those of FIG. 1 except that the cobalt oxide modified acicular gamma-$Fe_2O_3$ particles had been reduced to various degrees of FeO.

FIG. 2 shows a chart similar to that of FIG. 1 except that the coercivity $H_c$ is plotted vs. percent FeO modification. Each of curves 11–19 of FIG. 2 represents one of the sets of five tapes of Table I at each level of cobalt modification as follows:

| Curve (reference character): | Percent cobalt |
|---|---|
| **11** | .9 |
| **12** | 1.05 |
| **13** | 1.75 |
| **14** | 2.35 |
| **15** | 4.6 |
| **16** | 6.55 |
| **17** | 9.6 |
| **18** | 11.2 |
| **19** | 22.4 |

The curves of FIGS. 1 and 2 indicate a preferred cobalt oxide modification of 1–12% cobalt by weight of the iron oxide and a preferred FeO modification of about 3–20%, or about 3–15% at the high end of the preferred 1–12% cobalt modification.

Table II lists data for saturated remanence retention after 30 minutes at 150° C. for magnetic recording tapes representative of the present invention and prepared as described above. The tapes were made with acicular gamma-$Fe_2O_3$ particles modified with cobalt oxide in amounts recorded by weight in percent cobalt and further modified by reduction to provide the indicated weight percent of FeO. Values are reported for saturated remanence retention both parallel and perpendicular to particle orientation. Also reported in Table II for each tape is the ratio of loss of saturated remanence in the perpendicular direction to that in the parallel direction.

TABLE II

| Percent cobalt | Percent FeO | Saturated remanence retention: Parallel | Saturated remanence retention: Perpendicular | Ratio of loss of saturated remanence |
|---|---|---|---|---|
| 1.05 | 0 | 95.0 | 79.0 | 4.2 |
| | 6.25 | 92.5 | 72.0 | 3.7 |
| | 12.6 | 91.5 | 82.0 | 2.1 |
| | 17.5 | 99.0 | 85.0 | 15.0 |
| | 24.8 | 99.0 | 90.0 | 10.0 |
| 2.35 | 0 | 87.5 | 67.5 | 2.6 |
| | 2.45 | 84.5 | 61.7 | 2.5 |
| | 11.8 | 93.0 | 85.6 | 2.1 |
| | 16.2 | 97.3 | 84.4 | 5.8 |
| | 18.6 | 96.5 | 83.5 | 4.7 |
| 9.6 | 0 | 84.0 | 58.0 | 2.6 |
| | 1.5 | 89.0 | 68.5 | 2.9 |
| | 10.0 | 96.0 | 84.5 | 2.9 |
| | 18.0 | 83.7 | 67.5 | 2.0 |
| | 18.5 | 86.0 | 69.0 | 2.2 |
| 22.4 | 0 | 83.3 | 67.0 | 2.0 |
| | 3.0 | 85.5 | 76.6 | 1.6 |
| | 5.6 | 86.9 | 72.2 | 2.1 |
| | 10.5 | 85.0 | 78.5 | 1.4 |
| | 17.1 | 80.5 | 75.0 | 1.1 |

Data for tapes made with acicular cobalt oxide modified gamma-$Fe_2O_3$ particles containing no FeO modification is plotted in FIG. 3 showing saturated remanence retention vs. percent cobalt modification. The saturated remanence retention in curve 20 is measured parallel to particle orientation, and in curve **20*a* is measured perpendicular to particle orientation. Some of the points from which curves 20 and 20*a*** are drawn are taken from Table II.

Figure 4:
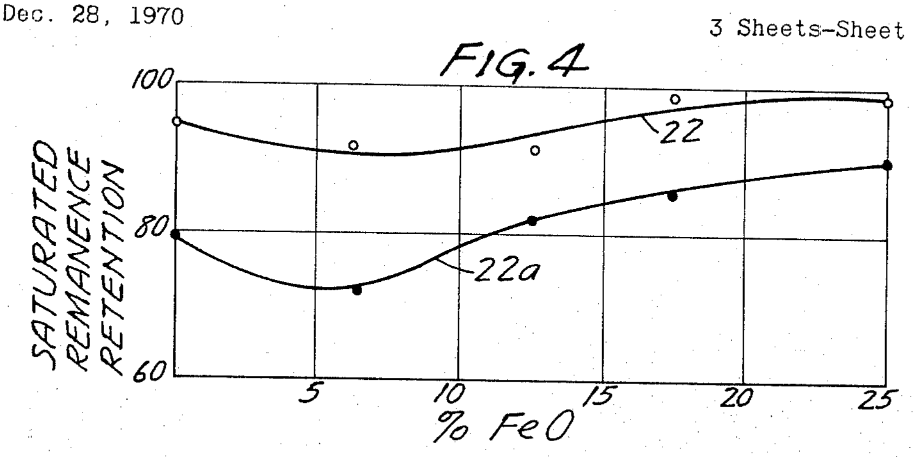

FIGS. 4–7 show charts of data from Table II for tapes made with acicular cobalt oxide modified gamma-$Fe_2O_3$ particles containing various degrees of FeO modification. FIG. 4 shows plots of saturated remanence retention vs. percent FeO modification for tapes made from acicular gamma-$Fe_2O_3$ particles which had been modified to the extent of 1.05 percent cobalt. The saturated remanence retention was measured parallel to particle orientation for curve 22 and perpendicular to particle orientation for curve **22*a***.

Figure 5:
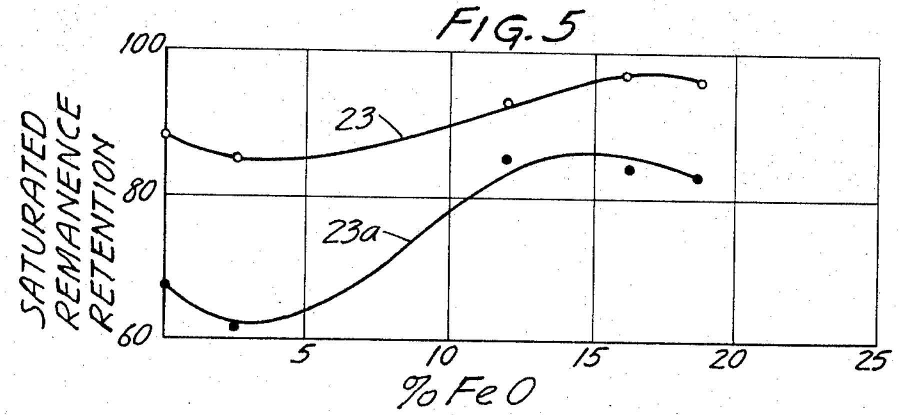
Figure 6:
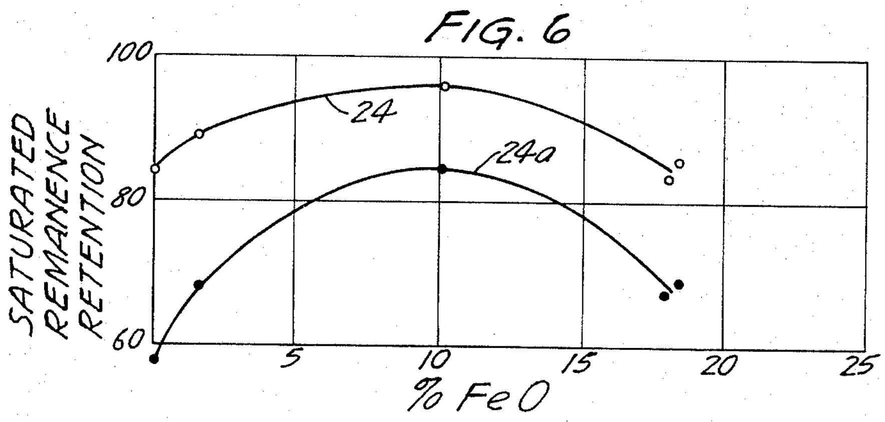
Figure 7:
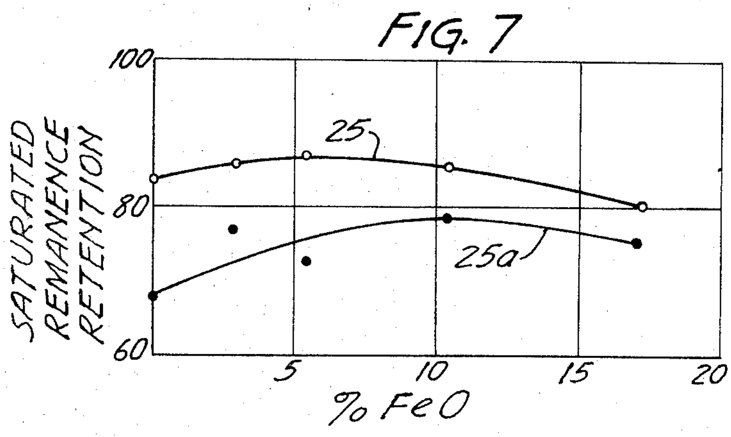

FIGS. 5–7 are similar to FIG. 4 except for the amount of cobalt as follows:

| Figure | Percent cobalt | Curve | Direction to particle orientation |
|---|---|---|---|
| 5 | 2.35 | 23 | Parallel. |
| | | 23a | Perpendicular. |
| 6 | 9.6 | 24 | Parallel. |
| | | 24a | Perpendicular. |
| 7 | 22.4 | 25 | Parallel. |
| | | 25a | Perpendicular. |

EXAMPLE 1

To 700 gallons of tap water in a 1000-gallon stainless steel vessel was added 70.5 pounds of $CoCl_2 \cdot 6H_2O$ with stirring until completely dissolved. To this was added 555 pounds of conventional acicular gamma-$Fe_2O_3$ which had been pulverized to pass 60 mesh. The gamma-$Fe_2O_3$ particles had an average ratio of length to width of about 5:1 and averaged about ¼ micron in length. After rapid stirring until the slurry would pass 325 mesh, 71.6 pounds of 29% $NH_4OH$ was added quickly with continued rapid stirring and the pH was adjusted to 8.5±0.5 with ammonium hydroxide. Continued stirring for 30 minutes followed by decanting, washing, filtering and drying resulted in a cake of an intimate mixture of acicular gamma-$Fe_2O_3$ and cobalt hydroxide containing some water of crystallization. The cake was powdered, placed in a rotary kiln and heated in an inert (nitrogen) atmosphere at 425° C. The acicular gamma-$Fe_2O_3$ particles were thus modified by 3.1% by weight of cobalt based on the weight of the iron oxide.

800 grams of these acicular gamma-$Fe_2O_3$ particles modified with cobalt oxide were placed in a one-gallon porcelain ball mill with ¼-inch steel balls, and there was added 420 grams of methyl ethyl ketone, 140 grams of toluol, 56 grams of wetting agent and 5.5 grams of lubricant. The paste obtained after milling for 24 hours was modified by the addition of a solution of a polyesterurethane polymer in four equal charges with one hour of milling time between successive charges. The total solution consisted of 114.2 grams of the urethane polymer and 685.8 grams of equal parts by weight of toluol and methyl ethyl ketone. The polyesterurethane polymer was obtained commercially under the designation "Estane" 5703 and is understood to be a polymer prepared from about 12 mols p,p'-diphenyl methane diisocyanate and 13 mols of a polyester of adipic acid and butanediol-1,4 of about 820 average molecular weight. Average molecular weight of the urethane polymer was about 14,000.

This dispersion was further modified by another 12 grams of lubricant and then diluted with equal parts of toluol and methyl ethyl ketone in 200-gram increments until a useable coating consistency was obtained. Milling was continued for one hour between successive additions.

The final dispersion was transferred and subjected to high-shear mixing for 30 minutes, passed through a 5-micron filter, coated onto 100-gauge biaxially-oriented polyethylene terephthalate film, and the coating was immediately passed through a unidirectional magnetic field of 1500 oersteds to physically align the acicular particles in the longitudinal direction of the film backing before drying in an oven. The dried coating thickness was approximately 70 micro-inches (1.8 microns). The surface of the dried coating was polished, followed by slitting to ½-inch tape widths and overcoating with silicone polymer as a lubricant as taught in U.S. Pat. No. 2,654,681.

The resultant magnetic recording tape was subjected to the above-described pulse resolution test at selected flux changes per inch (FCI) in comparison to 3M #777 tape. With write current optimized for peak output on each tape at each FCI, the following results were noted:

| At FCI of— | Percent peak pulse output [1] |
|---|---|
| 800 | 115 |
| 1600 | 152 |
| 3200 | 284 |
| 6400 | 800 |
| 9600 | 2000 |

[1] Relative to 3M #777 tape.

With write current optimized for peak output on the 3M #777 tape at 1600 flux changes per inch (FCI), the following results were noted:

| At FCI of— | Percent pulse output [1] |
|---|---|
| 800 | 117 |
| 1600 | 148 |
| 3200 | 292 |
| 6400 | 2600 |
| 9600 | (2) |

[1] Relative to 3M #777 tape.
[2] Too large to be meaningful.

The recording tape of this example in the longitudinal direction had a coercivity of 600 oersteds and a $B_r$ of 2100 gauss measured with a 3000-oersted applied field. It had satisfactory thermal magnetization stability as evidenced by 80% saturated remanence retention after 30 minutes at 150° C. In the above-described loop decay test, it evidenced a reasonably satisfactory loss of 3 db after 1000 passes.

EXAMPLE 2

To two liters of tap water in a 4-liter stainless steel vessel was added with stirring 200 grams of the conventional acicular gamma-$Fe_2O_3$ of Example 1. The pH of the resultant slurry was adjusted to 7.5 with 20% $NH_4OH$, and 7.4 grams of commercial grade cobalt hydroxide was added. After rapid stirring for one hour, the slurry was filtered and the residue was dried at 100° C. and pulverized. This product was heated in a rotary kiln at 370° C. for 30 minutes in a nitrogen atmosphere.

These cobalt oxide modified gamma-$Fe_2O_3$ particles were ball milled in toluene at 45% solids with a suitable wetting agent. To the resultant paste was added a plasticized copolymer of 89 parts vinyl chloride and 11 parts vinyl acetate (VYHH) dissolved in methyl ethyl ketone in an amount providing two parts by weight of the particles per one part of the binder. Milling was continued to provide a coatable dispersion. This was coated on 100-gauge biaxially-oriented polyethylene terephthalate film and immediately passed through a unidirectional magnetic field of 1500 oersteds to physically align the acicular particles in the longitudinal direction of the tape. After drying the coating, the resultant magnetic recording tape exhibited in the longitudinal direction a coercivity of 500 oersteds, $\phi_r$ of 0.472 lines, $\phi_{max}$ of 0.678, and $B_r$ of 1100 gauss. After 30 minutes at 150° C., saturated remanence retention in the direction of particle alignment was 88% and in the perpendicular direction was 74%. The ratio of loss of saturated remanence in the direction perpendicular to particle alignment to that parallel to particle alignment was 2.2.

EXAMPLE 3

Cobalt oxide modified gamma-$Fe_2O_3$ particles were made by the same procedure as in Example 2 except that 500 grams of the acicular gamma-$Fe_2O_3$ was added to three liters of deionized water, and after the pH adjustment, 18.8 grams of the cobalt hydroxide was added. The acicular gamma-$Fe_2O_3$ particles were thus modified by 2.35% by weight cobalt.

These and particles made in the same way but with various degrees of cobalt oxide modification were employed to make magnetic recording tapes which upon testing yielded data reported in Tables I and II.

EXAMPLE 4

The cobalt oxide modified acicular gamma-$Fe_2O_3$ particles of Example 3 were heated in individual batches to 370° C. in a rotary kiln and reduced with hydrogen until the particles comprised various percentages FeO by weight. Magnetic recording tapes made with these particles exhibited coercivities and thermal magnetization stabilities as recorded in Tables I and II above and illustrated in the accompanying drawings.

EXAMPLE 5

Eight grams of $CoCl_2 \cdot 6H_2O$ was dissolved in four liters of tap water, and 100 grams of the conventional acicular gamma-$Fe_2O_3$ of Example 1 was added with rapid stirring for 30 minutes. To this was added 4.1 grams of $Na_2CO_3 \cdot H_2O$ followed by an additional one hour of rapid stirring. The slurry was washed from the chloride ion, filtered, and the residue dried at 100° C. The resultant cake was pulverized and heated in an inert atmosphere in a rotary kiln at 370° C. for 40 minutes. The acicular gamma-$Fe_2O_3$ was thus modified with 2.0% by weight cobalt.

Magnetic recording tape made of these particles had longitudinally a coercivity of 400 oersteds, a $B_r$ of 950 gauss, and a saturated remanence retention of 95.3%.

EXAMPLE 6

Cobalt oxide modified acicular gamma-$Fe_2O_3$ particles of this invention were made starting with FeO·OH, yellow iron oxide needles having a length-to-width ratio of about 5:1 and an average length of about ¼ micron. To an agitated suspension of 23.8 parts by weight of the FeO·OH in 8700 parts water was added 3 parts of $CoCl_2 \cdot 6H_2O$ with stirring until completely dissolved. To this was added 14 parts of a 29% ammonia solution, and rapid stirring was continued for one hour, followed by decanting, washing, filtering and drying to obtain an intimate mixture of FeO·OH and cobalt hydroxide. The mixture was powdered, heated in an inert atmosphere to achieve dehydration and reduced in a hydrogen atmosphere at 375° C. to form acicular magnetite ($Fe_3O_4$), followed by heating in air at 325° C. for 30 minutes to form acicular gamma-$Fe_2O_3$ modified with cobalt oxide in an amount providing 2.9% by weight of cobalt.

The resulting powder was made into magnetic recording tape by the method of Example 2. The tape exhibited in the longitudinal direction a coercivity of 495 oersteds, a $B_r$ of 980 gauss and a saturated remanence retention of 93%.

EXAMPLE 7

As of the date of filing our application Ser. No. 32,919 (Apr. 29, 1970), the process of Example 6 was being carried out on a commercial basis using FeO·OH yellow iron oxide needles having a length-to-width ratio of about 8:1 and an average length of about 0.4 micron. (Since the FeO·OH needles are made in the same way as they were at the time Example 6 was carried out, the dimensions reported in Example 6 may have been too conservative.) Various degrees of cobalt oxide modification are obtained by employing various amounts of the cobalt chloride, with the amount of ammonia solution adjusted to provide a pH within the range of 8.0–9.5. In each case washing is continued until the conductivity of the supernatant liquid is less than 2500 micromhos.

Various batches of these commercially produced particles were tested for cobalt content and converted by the procedure of Example 2 into magnetic recording tapes which were tested both in the longitudinal (parallel to particle orientation) and crosswise directions. The results are reported in Table III along with data calculated therefrom. $H_c$, $\phi_r$ and $\phi_{max}$ were measured with a 3000-oersted applied field on a 60-cycle hysteresis loop tracer measuring B-H vs. H, and $B_r$ was calculated. Squareness in each direction was determined by dividing $\phi_r$ by $\phi_{max}$. The squareness in the crosswise direction to provide the squareness ratio. The saturated remanence retention and the ratio of loss of saturated remanence were determined as disclosed above. The Q-factor (quality-factor) for each tape was determined by multiplying (1) the longitudinal coercivity in oersteds by (2) the squareness ratio and (3) the ratio of loss of saturated remanence.

EXAMPLE 8

Various batches of the cobalt oxide modified acicular gamma-$Fe_2O_3$ particles of Example 7 were used to make magnetic recording tapes at a 5:1 weight ratio of particles to binder. These were tested as in Example 7, and results are reported in Table IV.

In spite of their acicular appearance, the particles of Example 7 containing high percentages of cobalt and high coercivity did not provide high degrees of orientation, as indicated by squareness ratios approaching unity (see Tables III and IV). Saturated remanence retention of these tapes after 30 minutes at 150° C. was not as high as in tapes made from the particles of lower coercivity, and their ratios of loss of saturated remanence were similarly reduced. However, because of their high coercivity and good squareness, the magnetic recording tapes made with the particles of high coercivity are excellent for recording of high frequencies—just as are the tapes made with the particles of lower coercivity.

COMPARATIVE EXAMPLE A

Abeck et al. Pat. No. 3,117,933 reports the preparation of cobalt-containing, needle-shaped, gamma-ferric oxide particles. Example 1 of that patent was followed except that the chemicals were employed at 75% of the stated amounts to fit the size of the available reactor. However, the suspension of metal hydroxides was found to have a pH of 8.3 instead of the 6 reported in the patent. The greenish-blue color gradually lightened during air oxidation and eventually had become orange-brown when the air oxidation was stopped when the pH reached 4.7 after 16¾ hours.

After adding the water, heating to 50° C. and increasing the air flow, the ferrous cobalt solution and the sodium hydroxide were added dropwise over a period of 20 hours while the pH was maintained between 4.8 and 5.3. At this point the pH began to drop, so the slurry was dumped into 20 gallons of deionized water. Washing was continued until the conductivity of the wash water reached 190 micromhos. The dried material was reduced in hydrogen at 390° C. for 65 minutes, purged for 5 minutes with nitrogen at 240° C. and oxidized in air at 300° C. for 65 minutes.

A photomicrograph of the product particles revealed a significant portion of acicular particles of the approximate dimensions reported in Abeck Example 1 plus a large number of much smaller acicular particles. Ordinary acicular gamma-$Fe_2O_3$ particles often have much the same appearance. These particles were converted into magnetic recording tape and tested in the same way as those of Example 7, and the results are shown in Table III.

COMPARATIVE EXAMPLE B

Because the first pH value of about 6 reported in Abeck Example 1 was not realized in Comparative Example A, Abeck Example 1 was followed in the same way except that 1:1 sulfuric acid was added before putting in the sodium hydroxide to correct the initial pH to 6.0. As a consequence of that modification, the pH changed during air oxidation from a maximum 6.2 to 4.7 in only 56 minutes.

At this point, water was added and the procedure detailed in Comparative Example A was followed except that the dropwise additions took place over a period of 22 hours, and washing of the product was continued until the conductivity of the wash water was 53 micromhos. The product particles were less acicular than those of Comparative Example A and also less uniform in both size and shape. The particles and magnetic recording tape made therefrom were tested as in Example 7, with results in Table III.

COMPARATIVE EXAMPLE C

Abeck Example 3 was followed in an effort to obtain a greater cobalt oxide modification and correspondingly higher coercivity. As in the preceding comparative examples, the chemicals were used at 75%, but in this example the flow of air was also cut to 75%. As in Comparative Example B, 1:1 sulfuric acid was used to keep the pH below 6.2, here being added in increments alternating with increments of the sodium hydroxide. The pH dropped to 4.6 during the ensuing air oxidation in only 32 minutes.

After 23½ hours of the dropwise additions, all of the iron-cobalt solution had been added but a little over one liter of sodium hydroxide remained, apparently because the reaction was going more slowly due to the lower volume of air flow. Dropwise addition of the sodium hydroxide was continued over the next 3 hours while contintuing to hold the pH within 4.7 and 5.3. When all the sodium hydroxide was added, the air flow was stopped, the heat shut off, and the pH was 5.1. At this point the iron was 20.3% $Fe^{++}$. After standing overnight, the iron was 20.0% $Fe^{++}$, and the pH had dropped to 4.7. Washing was begun and continued until the wash water had the conductivity of deionized water, i.e., 10 micromhos.

After the final reduction-oxidation, the appearance of the product particles in a photomicrograph was generally similar to that of the particles of Comparative Example B except that an appreciable amount of contaminant appeared to be present. The particles and tape made therewith were tested as in Example 7, with results reported in Table III.

TABLE III

| Length L crosswise C | Products of Example 7 | | | | | | Comparative Examples A | Comparative Examples B | Comparative Examples C |
|---|---|---|---|---|---|---|---|---|---|
| Percent cobalt [1] | 1.23 | 1.64 | 1.87 | 2.00 | 3.12 | 3.42 | 1.73 | 1.75 | 1.42 |
| $H_c$ (oersteds): | | | | | | | | | |
| L | 403 | 460 | 513 | 547 | 820 | 960 | 377 | 322 | 310 |
| C | 338 | 393 | 429 | 467 | 782 | 924 | 345 | 310 | 292 |
| $\phi_r$ (lines): | | | | | | | | | |
| L | .685 | .639 | .652 | .671 | .398 | .546 | .669 | .810 | .553 |
| C | .496 | .472 | .498 | .545 | .423 | .490 | .402 | .517 | .472 |
| $\phi_{max.}$ (lines): | | | | | | | | | |
| L | .910 | .820 | .830 | .856 | .490 | .679 | .972 | 1.134 | .809 |
| C | .946 | .822 | .826 | .868 | .564 | .635 | .649 | .805 | .778 |
| Squareness ($\phi_r/_{max.}$): | | | | | | | | | |
| L | .753 | .779 | .785 | .784 | .813 | .804 | .720 | .714 | .684 |
| C | .524 | .574 | .604 | .628 | .750 | .772 | .620 | .642 | .606 |
| Squareness ratio | 1.44 | 1.36 | 1.30 | 1.25 | 1.08 | 1.04 | 1.16 | 1.11 | 1.13 |
| $B_r$ (gauss) | 843 | 920 | 868 | 883 | 982 | ------- | 830 | 820 | 840 |
| Saturated remanence retention: | | | | | | | | | |
| L | 93 | 90.5 | 89.5 | 87 | 76.5 | 73 | 92.5 | 87.5 | 94.5 |
| C | 81.5 | 74.5 | 68.5 | 68 | 61 | 62 | 84.0 | 76.5 | 88 5 |
| Ratio of loss of saturated remanence | 2.65 | 2.7 | 3.1 | 2.5 | 1.7 | 1.4 | 2.1 | 1.9 | 2.1 |
| Q-factor | 1,500 | 1,700 | 2,100 | 1,700 | 1,500 | 1,400 | 920 | 680 | 740 |

[1] Percent cobalt determined by colorimetric analysis at 650 mμ.

TABLE IV

| Length L crosswise C | Products of Example 7 | | | | | |
|---|---|---|---|---|---|---|
| Percent cobalt | 1.23 | 1.64 | 1.87 | 2.00 | 3.12 | 3.42 |
| He (oersteds): | | | | | | |
| L | 374 | 431 | 494 | 521 | 794 | 958 |
| C | 308 | 359 | 410 | 446 | 738 | 895 |
| $\phi_r$ (lines): | | | | | | |
| L | .684 | .596 | .642 | .651 | .649 | .598 |
| C | .387 | .405 | .471 | .494 | .573 | .547 |
| $\phi_{max.}$ (lines): | | | | | | |
| L | .909 | .771 | .815 | .829 | .802 | .738 |
| C | .726 | .714 | .766 | .749 | .750 | .700 |
| Squareness ($\phi_r/\phi_{max.}$): | | | | | | |
| L | .753 | .773 | .788 | .785 | .810 | .810 |
| C | .533 | .567 | .614 | .660 | .765 | .782 |
| Squareness ratio | 1.41 | 1.36 | 1.28 | 1.19 | 1.06 | 1.035 |
| $B_r$ (gauss) | 1,160 | 1,090 | 1,145 | 1,170 | 1,180 | 1,080 |
| Saturated remanence rentention: | | | | | | |
| L | 93 | 89 | 86.5 | 84.5 | 75.5 | 72.5 |
| C | 82.5 | 72.5 | 66.5 | 70 | 59.5 | 59.5 |
| Ratio of loss of saturated remanence | 2.5 | 2.4 | 2.5 | 1.9 | 1.7 | 1.5 |
| Q-factor | 1,300 | 1,400 | 1,600 | 1,200 | 1,400 | 1,500 |

We claim:

1. Acicular iron oxide particles comprising gamma-$Fe_2O_3$ modified by cobalt oxide in an amount providing at least ¼ percent cobalt of the weight of modified iron oxide, which particles when combined in at least two parts by weight per one part of nonmagnetizable binder in the manufacture of magnetic recording tape and physically aligned provide in the aligned direction a coercivity exceeding 350 oersteds and a Q-factor of at least 1100.

2. Acicular particles as defined in claim 1 wherein about 1–28 percent by weight of the iron oxide is FeO.

3. Acicular particles as defined in claim 1 wherein the cobalt oxide modification provides ½ to 25 percent cobalt based on the weight of modified iron oxide.

4. Acicular particles as defined in claim 1 wherein the particles when combined with the binder further provide in the aligned direction after 30 minutes at 150° C. a saturated remanence retention of at least 70% and a loss of saturated remanence perpendicular to particle alignment at least 1.5 times the loss parallel to alignment.

5. Magnetic recording medium comprising a nonmagnetizable backing member carrying a uniform coating of a homogeneous admixture comprising by weight a minor proportion of a nonmagnetizable binder and a major proportion of aligned acicular iron oxide particles comprising gamma-$Fe_2O_3$ modified by cobalt oxide in an amount providing at least ¼ percent cobalt of the weight of modified iron oxide, which medium has in the direction of alignment a coercivity exceeding 350 oersteds and a Q-factor of at least 1100.

6. Magnetic recording medium as defined in claim 5 in tape form wherein the cobalt oxide modification provides ½ to 25% cobalt based on the weight of the modified iron oxide and the tape has in the aligned direction a saturated remanence retention of at least 70% after exposure to 150° C. for 30 minutes and a loss of saturated remanence perpendicular to particle alignment at least 1.5 times the loss parallel to alignment after 30 minutes at 150° C.

7. Magnetic recording tape as defined in claim 6 wherein the cobalt oxide modification provides about 1–12 percent cobalt by weight of the modified iron oxide.

8. Magnetic recording tape as defined in claim 6 wherein up to 28 percent by weight of the iron oxide comprises FeO.

References Cited

UNITED STATES PATENTS 3,117,933 1/1964 Abeck et al. ........ 252—62.56
3,243,375 3/1966 Jesche .............. 252—62.56

OTHER REFERENCES

"Cobalt" Centre d'Information du Cobalt, Brussels, Belgium, Abstract No. 26, March 1965.

WILLIAM D. MARTIN, Primary Examiner

J. H. NEWSOME, Assistant Examiner

U.S. Cl. X.R.

117—238; 161—168; 252—62.56

Dedication 3,725,126.—*Willis D. Haller*, St. Paul and *Raymond M. Colline*, Oakdale, Minn. MAGNETIC RECORDING TAPE. Patent dated Apr. 3, 1973. Dedication filed June 14, 1977, by the assignee, *Minnesota Mining and Manufacturing Company*.

Hereby dedicates to the Public the remaining term of said patent.

[*Official Gazette September 6, 1977.*]